United States Patent [19]

Ichikawa et al.

[11] Patent Number: 4,710,152

[45] Date of Patent: Dec. 1, 1987

[54] CRANK DAMPER PULLEY STRUCTURE FOR THE INTERNAL COMBUSTION ENGINE OF A CAR

[75] Inventors: Noriyuki Ichikawa; Tetsushi Suzuki; Tomiaki Atsumi, all of Shizuoka, Japan

[73] Assignee: Toyota Jidosha Kabushiki Kaisha, Toyota, Japan

[21] Appl. No.: 838,940

[22] Filed: Mar. 12, 1986

[30] Foreign Application Priority Data

Mar. 13, 1985 [JP] Japan .................................. 60-048300

[51] Int. Cl.$^4$ .......................... F16F 15/12; F16H 55/36
[52] U.S. Cl. ..................................... 474/166; 474/191; 74/574
[58] Field of Search ............... 474/166, 169, 170, 178, 474/191, 192; 74/574

[56] References Cited

U.S. PATENT DOCUMENTS

| | | | |
|---|---|---|---|
| 2,041,507 | 5/1936 | Zeder | 74/574 |
| 2,898,777 | 8/1959 | Boehm | 74/574 |
| 3,945,269 | 3/1976 | Bremer, Jr. | 74/574 |
| 3,988,948 | 11/1976 | Thien et al. | 74/574 |

FOREIGN PATENT DOCUMENTS

| | | | |
|---|---|---|---|
| 0077947 | 5/1983 | Japan | 74/574 |
| 0077946 | 5/1983 | Japan | 74/574 |

Primary Examiner—James A. Leppink
Assistant Examiner—Terry Lee Melius
Attorney, Agent, or Firm—Cushman, Darby & Cushman

[57] ABSTRACT

A crank damper pulley structure of an internal combustion engine of a car in which the hub of a pulley, which is removably fixed to the tip of the engine crank shaft and transmits power to auxiliary machinery, such as an alternator, has therearound a damper mass and a damper rubber comprising a torsional damper. The hub has a cavity therein which opens to one end of the hub. A damper support is fixed in the cavity and a ring-like damper and a ring-like damper mass are superposed axially with the rubber being fixed to the mass and the support in order to constitute a ring-like dynamic damper disposed in the cavity which copes with bending vibration of the crank shaft.

16 Claims, 17 Drawing Figures

CRANK DAMPER PULLEY STRUCTURE FOR THE INTERNAL COMBUSTION ENGINE OF A CAR

FIELD OF THE INVENTION

This invention relates to the technical field of a crank damper pulley structure which is disposed at the tip of the crank shaft of an engine of a car and dampens and absorbs the bending vibration of the crank shaft while driving, via a belt, auxiliary machinery, such as a generator.

BACKGROUND OF THE INVENTION

As is well known in the art, an internal combustion engine, such as a gasoline engine, is used to drive a car, and the power of the reciprocating operation of a 4 or 6 cylinder engine is transmitted to the wheels from one end of the engine crank shaft, and auxiliary machinery, such as an alternator, usually is driven by the other end of the crank shaft through a pulley and one or more belts.

Vibromotive force is applied to the crank shaft, due to inertia forces of the engine and the combustion force of the cylinders, and the shaft's rotary motion is subjected to torsional vibration, as is long known in the art. Therefore, a so-called "torsional damper" has been developed to restrict the vibration of a car body and the noise to the passenger compartment resulting from such torsional vibration.

It has been technically difficult to arrange a torsional damper in the power transmission path at the wheel-driving end of the crank shaft because of obvious complications. Therefore, since a pulley hub and a pulley mechanism for the transmission of power to auxiliary machinery, such as an alternator, is disposed at the other end of the shaft, a torsional damper has been arranged around the pulley hub by utilizing its relatively open mechanism.

As shown in FIG. 14 of the accompanying drawings, in such a prior arrangement a pulley hub 3 usually is fastened by a screw 2 and a key (not shown) to the tip of a crank shaft 1 in such a manner as to be capable of transmitting torque and to prevent the hub from falling off the shaft. A damper mass 5, which has a belt groove 4 for the transmission of power, via a belt (not shown) to auxiliary machinery, such as an alternator, is disposed about the pulley hub 3, and damper rubber 6 is interposed between the damper mass 5 and the pulley hub 3 and fixed to both, as by baking, thereby forming a torsional damper 7.

It is well known in the art, however, that in a 4 or 6 cylinder engine or the like, bending vibration also is generated in the crank shaft due to inertia forces and the combustion forces because the pins and journals of the crank shaft 1 are not arranged symmetrically in an axial direction. In conventional engines, however, not only the cylinder block but also the crank shaft is extremely heavy and has extremely large rigidity. Therefore, even when bending vibration is generated, it is not very great. In recent years, however, the weight of the crank shaft has been reduced in order to improve fuel consumption and to control torque more accurately, while horse power has been increased. These two factors together increase bending vibration. Thus, a dynamic damper for bending vibration has been earnestly desired from the technical aspect of both restricting the vibration of and suppressing noise in the car body.

When the frequency of bending vibration is plotted on the abscissa and the amplitude on the ordinates, as shown in FIG. 15, a peak of vibration appears at a predetermined frequency $f_o$, such as represented by the curve $C_1$. Moreover, it has been shown that uninodal vibration $Q_1$ and binodal vibration $Q_2$ also develop, as shown in FIGS. 16 and 17, respectively. A low-order bending vibration, such as the uni- and binodal vibrations, vibrates the cylinder block and is a significant factor for the occurrence of noise in the passenger compartment, to say nothing of the vibration of the car body. Further, when bending vibration becomes great, a crucial problem occurs in the strength of the crank shaft itself.

The conventional crank damper pulley structure, such as shown in FIG. 14, is primarily directed to obtain a torsional damper function to cope with the torsional vibration, and cannot be easily adapted to perform a dynamic damper function to cope with the low-order bending vibration described above.

The technique of Japanese Utility Model Laid-Open Publication No. 14139/1980, for example, disposes damper rubber inside a pulley hub but does not so dispose a damper mass. Therefore, this prior art device does not have a damping function against low-order bending vibration and, hence, its damping function cannot be fully effective.

In the damper pulley structure disclosed in Japanese Utility Model Laid-Open Publication No. 70554/1983, the torsional damper function is not separated from the dynamic damper function to cope with the bending vibration, and, hence, the performance of the dynamic damper cannot be fully effective.

The prior art device of Japanese Patent Laid-Open Publication No. 40060/1984 puts emphasis on the torsional damper function so that the dynamic damper function against bending vibration is not fully effective.

SUMMARY OF THE INVENTION

An object of the present invention is to eliminate the above-described problems with prior art devices and to provide a crank damper pulley structure for a car which has a sufficient torsional damper function on a crank shaft, assists the engine to generate high horse power and high torque, reduces the weight of the crank shaft without resulting problems so as to improve fuel consumption, signficantly dampens and absorbs low-order bending vibration, suppresses vibration and noise of the engine block and thus contributes greatly to countermeasures for noise in the car. This is accomplished by arranging a dynamic damper within the hub of the pulley structure separate from a torsional damper arranged around the hub.

BRIEF DESCRIPTION OF THE DRAWINGS

FIGS. 1 through 13 are explanatory views of the present invention, wherein:

FIGS. 1 to 7, 9, 10, 11 and 13 are longitudinal sectional views of the torsional damper and dynamic damper that are disposed at the tip of the crank shaft in accordance with this invention;

FIG. 8 is an enlarged view corresponding to a part of FIG. 7 showing a modification thereof;

FIG. 12 is a front view of the dynamic damper shown in FIG. 11;

DETAILED DESCRIPTION OF THE INVENTION

Figure 1:
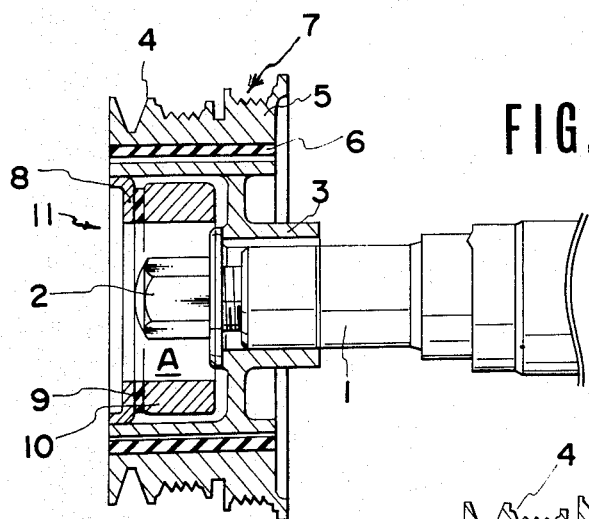

Referring now to the drawings, FIG. 1 shows a fundamental or basic embodiment of the present invention. A pulley hub 3 is removably fitted to the front end of a crank shaft 1 of an internal combustion engine of a car (not shown) via a screw 2 and a key (not shown) in the same way as in the prior art. The hub 3 usually comprises an outer cylindrical portion joined to a coaxial inner cylindrical portion of smaller diameter by a radial web portion, as shown. The head flange of the screw 2 bears against one end of the inner cylindrical portion of the hub 3. Thus, there is usually provided at that end of the hub 3 opposite the engine a coaxial cylindrical cavity or socket A.

Figure 14:
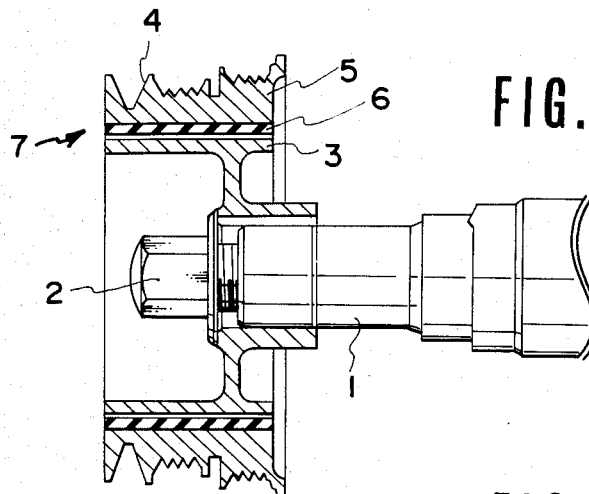
FIG. 14 is a longitudinal sectional view of a torsional damper disposed at the tip of a crank shaft in accordance with the prior art.

In order to form a torsional damper 7 for the torsional vibration of the crank shaft 1, in the same way as in the conventional embodiment shown in FIG. 14, a damper mass 5 having a belt groove 4 around its peripheral surface and a damper rubber 6 are superposed in a radial direction and are integrally fixed to each other and around the pulley hub 3, as by baking.

In order to form a dynamic damper 11 against low-order bending vibration, a somewhat pan-shaped damper support 8 having an axially-short cylindrical portion and an inturned annular flange portion is fitted into and fixed to the outer wall of the cavity A of the pulley hub 3. A ring-like damper rubber 9 and a damper mass 10 having a predetermined size are superposed in an axial direction and integrally fixed to each other and the rubber to that side of the flange of the damper support 8 facing the bottom of the cavity A to form a dynamic damper 11. This assembly is pushed into the cavity A so that the cylindrical portion of the support 8 is fixed to the pulley hub 3 by frictional engagement.

Therefore, in this embodiment which is equipped with the dynamic damper 11, the damper mass 5 and the damper rubber 6 that are superposed in the circumferential direction exhibit a fully vibration-proofing effect and vibration absorbing effect against the torsional vibration of the crank shaft 1 due to operation of the engine, and the damper rubber 9 and the damper mass 10 that are superposed in the axial direction causes damping and absorption of the low-order bending vibration such as the aforedescribed uninodal and binodal bending vibrations. As shown by curve $C_2$ in FIG. 15, the amplitude of the bending vibration and its peak are reduced. In consequence, all crank shaft vibration can be signficantly reduced and at the same time noise can also be significantly suppressed. In this embodiment, since the dynamic damper 11 is fitted into the cavity A at the front of the pulley hub 3, the space in the engine compartment occupied by the pulley can be utilized effectively, and the damping of vibration and absorption of noise against both torsional vibration and bending vibration can be fully effective.

Figure 2:
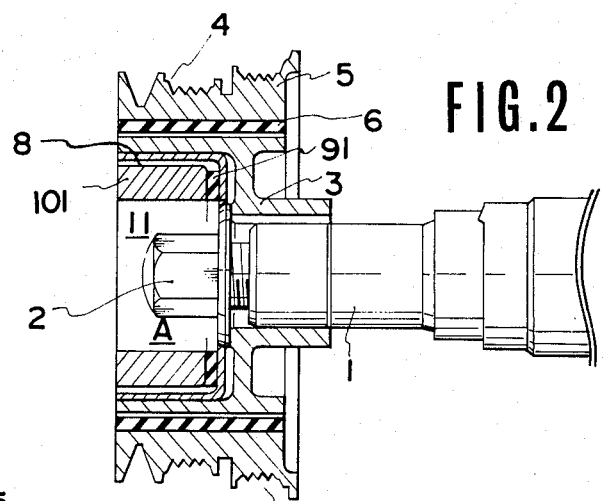

Next, the embodiment shown in FIG. 2 is fundamentally the same as the embodiment shown in FIG. 1 in that the dynamic damper 11 is fitted into and fixed to the front cavity A of the pulley hub 3 via a cup-shaped damper support 8 pushed thereinto. However, the mode of superposition of the damper rubber 91 and the damper mass 100 of the dynamic damper 11 in the longitudinal axial direction is reversed so as to axially lengthen and enlarge the peripheral area of the damper support 8 fixed to the pulley hub 3, thus strengthening the frictional fixing of the dynamic damper 11 to the pulley hub 3. This embodiment also utilizes effectively the space of the cavity A of the pulley hub 3. In this embodiment, too, the torsional damper 7 superposed in the circumferential direction around the outer circumference of the pulley hub 3 dampens and absorbs the torsional vibration and the dynamic damper 11 fully dampens and absorbs the low-order bending vibration. This embodiment can restrict the vibration of the cylinder block and can reduce the vibration of the car body and suppress the noise. The action and effects of this embodiment are exactly the same as those of the first embodiment. Since the circumferential area of the damper support fixed to the opposed corresponding area of the pulley hub 3 is large in this embodiment, the embodiment can prevent any shaking of the dynamic damper 11 due to any remaining low-order bending vibration of the crank shaft 1.

Figure 3:
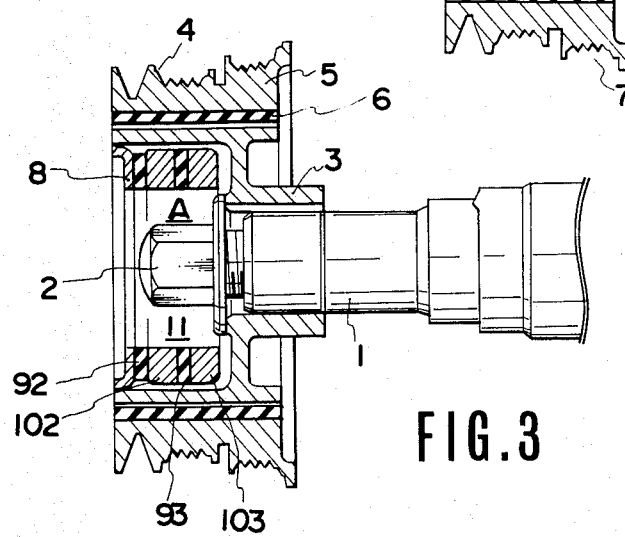

As described above, one-order or uninodal bending vibration can be dampened and absorbed by a one-mass or one-block dynamic damper 11 as in the embodiments shown in FIGS. 1 and 2. The embodiment shown in FIG. 3, however, is characterized in that damper rubbers 92 and 93 and damper masses 102 and 103 are alternately arranged axially and baked and fixed to the damper support 8 in order to more effectively dampen and absorb the one-order bending vibration of the uninodal vibration. In comparison with the first and second embodiments, the design of this embodiment is changed so that not only the double but also a triple or a quadruple dynamic damper can be used in order to obtain two, three or even four times the damper effects on low-order bending vibration of the embodiments shown in FIGS. 1 and 2.

Figure 4:
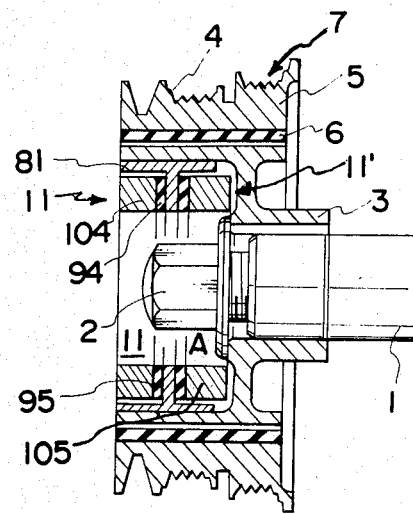
Figure 16:
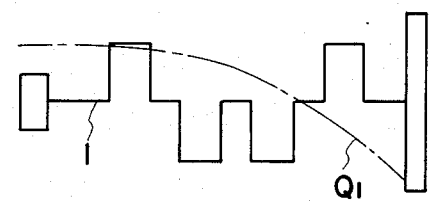
FIGS. 16 and 17 are graphical representations of the uni- and binodal bending vibration of the low-order bending vibration.
Figure 17:
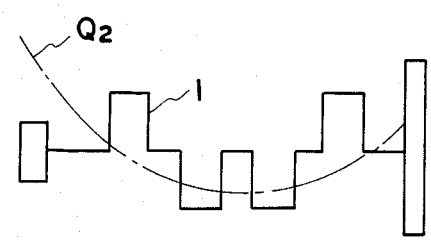

Next, in the embodiment shown in FIG. 4, the inturned radial flange of the support 8 is formed at an intermediate portion of the cylindrical portion of the damper support 81 to be pushed into and fixed in the cavity A of the pulley hub 3, and ring-like damper rubbers 94 and 95 and corresponding damper masses 104 and 105 are superposed in an axial direction in the cavity A and fixed to the opposite sides of the flange. Thus, dynamic dampers 11 and 11' are provided on opposite sides of the flange. As explained above with reference to FIGS. 16 and 17, uninodal bending vibration and binodal bending vibration occur on the crank shaft 1. In this embodiment, the dynamic damper 11' nearest the engine dampens and absorbs the uninodal bending vibration, while the dynamic damper 11 farthest from the engine dampens and absorbs the binodal bending vibration. Therefore, this embodiment can dampen and absorb not only the uninodal bending vibration of the crank shaft 1 of a 6 cylinder engine or the like, but also the binodal bending vibration and also can suppress its noise.

Figure 5:
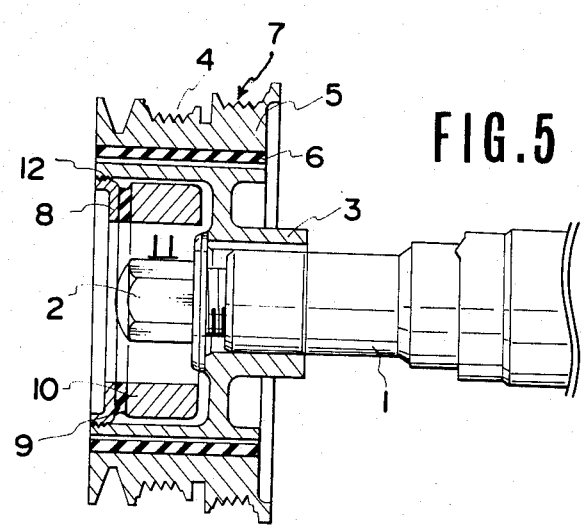

Each of the embodiments described above employs a push-in assembly for frictionally fitting and fixing the damper support 8 or 81 into the front cavity A of the pulley hub 3. In the embodiment shown in FIG. 5, however, which for exemplary purposes is like that shown in FIG. 1, the damper support 8 is fixed to the pulley hub 3 by use of a screw thread 12 therebetween which is of a hand (right or left as is appropriate) so as to tighten on rotation of the crank shaft 1. Therefore, this embodiment completely prevents the dynamic damper 11 from falling off the hub 3 during operation of the engine.

Figure 6:
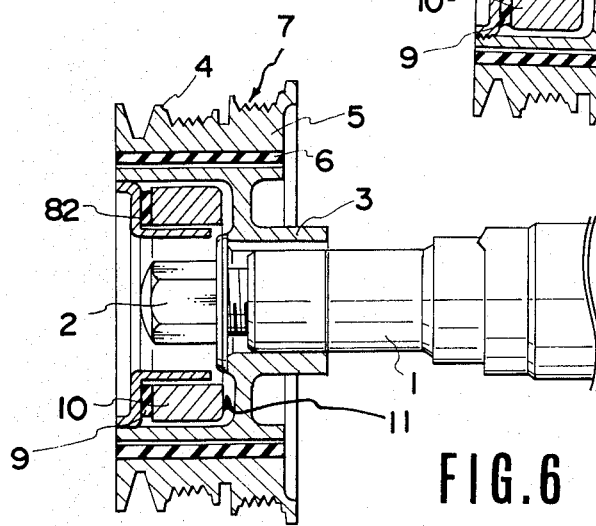

In the embodiment shown in FIG. 6, the damper support 82 is molded in a Z-shaped radial section and is under-hung with respect to the dynamic damper 11 in order to prevent damage of the damper rubber 9 and the damper mass 10 or to prevent the occurrence of vibration and noise if the damper components 9 and 10 peel off the support 82 and vigorously impinge against the pulley hub 3 inside the cavity A. Needless to say, the dynamic damper 11 of this embodiment dampens and absorbs the low-order bending vibration and the torsional damper 7 dampens and absorbs the torsional vibration in the same way as in the embodiments described above.

Figure 7:
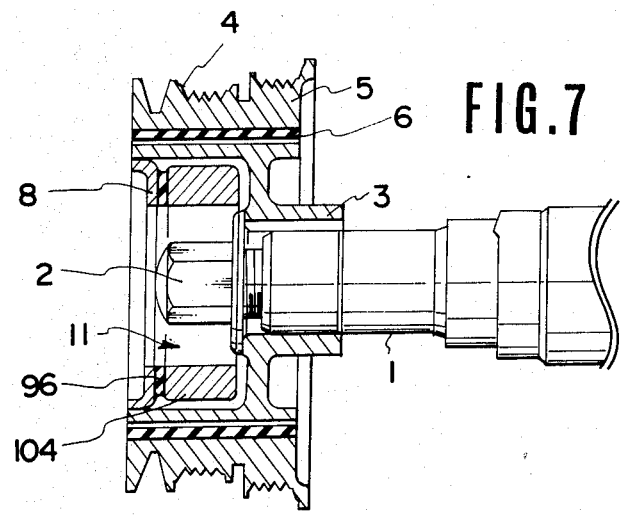

The resonance frequency of the bending vibration of the crank shaft 1 changes by several Hertz in accordance with the crank angle of the crank shaft, but this change can be eliminated by selecting a suitable resonance frequency of the dynamic damper 11 for the low-order bending vibration. In the embodiments shown in FIGS. 7 and 8, the damper rubber 96 and the damper mass 104 that are superposed on the damper support 8 in the axial direction may have their average axial thickness changed in the circumferential direction in order to change the resonance frequency of the damper 11 in accordance with the crank angle of the crank shaft 1. These embodiments provide a dynamic damper 11 which has greater accuracy for dampening results than those of the foregoing embodiments.

Figure 8:
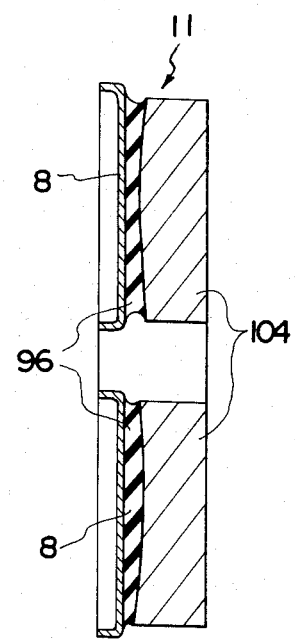

Further, since the dynamic damper rubber 96 and the damper mass 104 are baked to the damper support 8 as shown in FIG. 8, their joining surfaces are fixed to each other. Therefore, the design of the function of the dynamic damper may be changed while the unattached end surface of the mass 104 remains planar and perpendicular to the mass axis. In this design, where the portion of the damper mass 104 has an increased average thickness, the corresponding portion of the damper rubber has a decreased average thickness and vice-versa.

Figure 9:
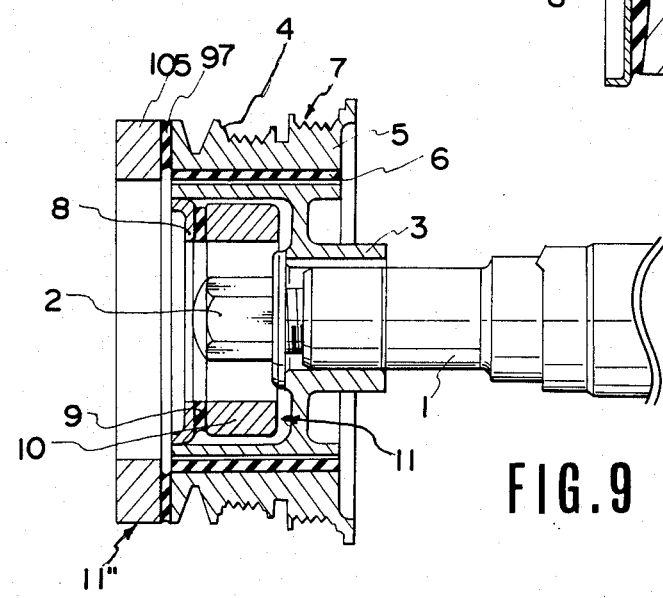

Depending upon kinds of engines used, two resonance points of the low-order bending vibration exist for the crank shaft 1. In the embodiment shown in FIG. 9, the damper rubber 9 and the damper mass 10 are baked and fixed to the damper support 8, and the assembly is pushed into and fixed in the cavity A of the pulley hub 3, in the same way as described above, to form one dynamic damper 11. Additionally, a second ring-like damper rubber 97 is disposed on the front surface of the damper mass 5 of the torsional damper 7, and a second ring-like damper mass 105 superposed axially on the rubber. These components 97 and 105 are then baked and fixed to each other and to the mass 5. This construction constitutes a second dynamic damper 11''. These dynamic dampers 11 and 11'' can cope with the bending vibration of the crank shaft having different resonance points by proper design of these dampers. Therefore, this embodiment has two dynamic damper functions in order to match simultaneously with the resonance frequencies due to the two resonance points of the bending vibrations, and to dampen and absorb them.

As illustrated with reference to the conventional embodiment of FIG. 14, it has been customary to fit the pulley hub 3 to the tip of the crank shaft 1 through a key and to fix it by a fastening screw 2. When the pulley hub 3 is to be removed from the tip of the crank shaft 1 for maintenance, the screw 2 is released and the pulley hub 3 is taken off the crank shaft 1. In practice, however, the pulley hub 3 is in most cases firmly fixed to the tip of the crank shaft 1, due to rust or incoming dust, and cannot be removed easily by merely releasing the screw 2. For this reason, a so-called "pulley removing tool" (not shown) is used which hooks around the flange of the pulley hub 3 to remove the hub. In accordance with the embodiments of the present invention described above, however, the dynamic damper 11 is disposed inside the cavity A at the front part of the pulley hub 3 so that the pulley removing tool cannot be hooked to the flange of the pulley hub 3 through the cavity A.

Figure 10:
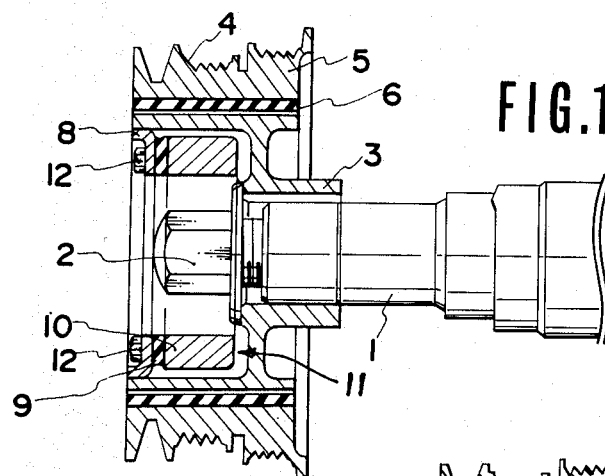

To cope with this problem, as shown in FIG. 10 a plurality of spaced-apart weld nuts 12 are fixedly disposed in the circumferential direction on the front surface of the damper support 8 to which the dynamic damper 11 is fixed. The pulley removing tool may be hooked to these weld nuts 12 in order to easily take off the pulley hub 3 from the crank shaft 1 after removal of the screw 2.

Figure 11:
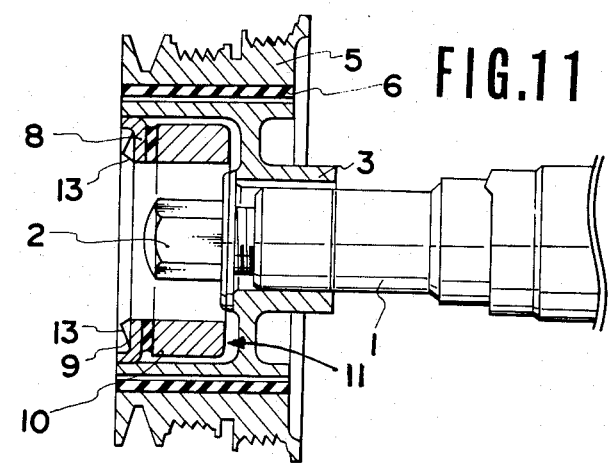
Figure 12:
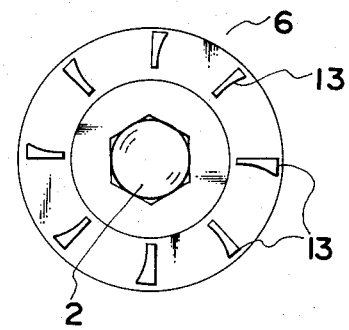

As illustrated in each of the foregoing embodiments, the dynamic damper of this invention dampens and absorbs the low-order bending vibration by effectively utilizing the space inside the front cavity A of the pulley hub 3. When the energy of the bending vibration is thus dampened, the energy of damping changes to thermal energy, and raises the temperature of the damper rubber 9. In such a case, the fixing force of the dynamic damper 11 to the damper support 8 which relies upon baking will decrease and the heat must be eliminated. Therefore, a plurality of centrifugal cooling fins 13 are fixed to the front surface of the inward extending flange of the damper support 8, as shown in FIGS. 11 and 12, so as to generate cooling flow of air on the front surface of the damper support 8 to thus cool the dynamic damper 11 and to reduce the temperature of the damper rubber 9 and to maintain the force fixing the damper rubber 9 to the damper support 8 and to the damper mass 10.

Figure 13:
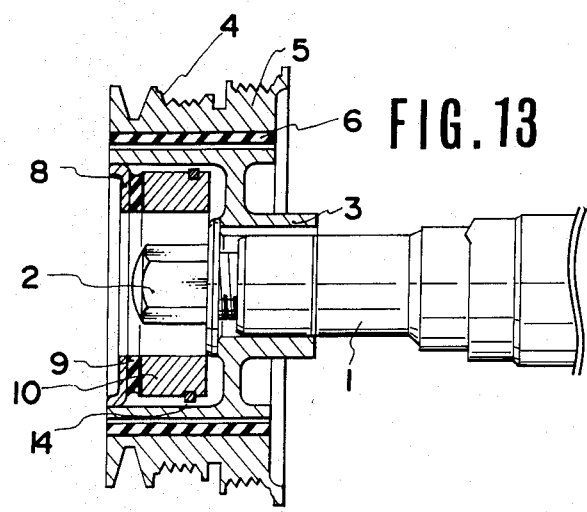

In the present invention, the dynamic damper 11 is disposed inside the front cavity A of the damper support 8 as described above. Apart from the damper rubber 9, the damper mass 10 that is fixed by baking to the damper support 8, may have an outer diameter approximate to the inner diameter of the damper support 3 depending upon its design. In such a case, the damper mass 10 will vibrate and may impinge against the inner wall of the pulley hub 3, before the vibration resulting from the low-order bending vibration is dampened, and will thus increase the amplitude of vibration and cause noise. Therefore, in the embodiment shown in FIG. 13, a rubber O-ring 14 is disposed in an O-ring groove in the outer surface of the damper mass 10 in order to prevent the outer surface of the damper mass from accidentally contacting the inner surface of the hub 3.

Needless to say, the present invention is not necessarily limited to the embodiments described above. For example, a plurality of materials may be used in the circumferential direction of the damper rubber and the damper mass to divide the dynamic damper circumferentially or the damper rubber and the damper mass may be disposed on the rear surface of the flange of the damper support via another damper support.

EFFECTS OF THE INVENTION

In the pulley hub disposed at the tip of the crank shaft of the internal combustion engine of conventional cars, the present invention disposes a dynamic damper to cope with the bending vibration by utilizing the space of the front cavity of the pulley hub, in addition to the torsional damper that has been arranged conventionally in order to cope with the torsional vibration. Therefore, the present invention can effectively dampen and absorb the low-order bending vibration, such as uni- and bi-nodal vibrations, can dampen and absorb the vibration and noise of the engine block and insure smooth driving. Thus, the present invention can promote weight reduction of not only the engine block but also the crank shaft, and can contribute to the saving of energy consumption. Moreover, the present invention can enhance the strength of the crank shaft.

Since the present invention can positively utilize the space of the front cavity of the pulley hub, the invention can eliminate the necessity of increasing the space at the tip of the crank shaft inside the engine compartment.

Figure 15:
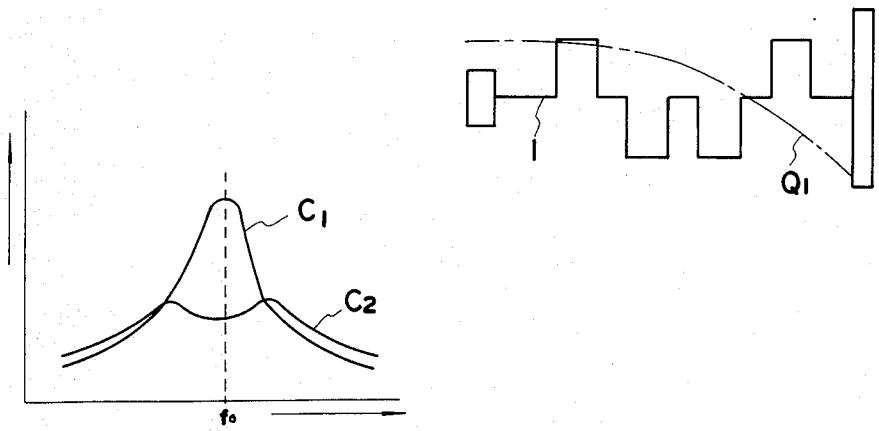
FIG. 15 is a graphical representation of relations between frequency and amplitude of the low-order bending vibration which occurs with only a conventional torsional damper and with an embodiment of the present invention.

Further, the curve $C_1$ having an amplitude peak at a specific frequency due to the low-order bending vibration in the conventional example shown in FIG. 15 can be changed to the curve $C_2$ having a reduced peak, and the vibration and noise of the engine can be controlled by employing an appropriate design.

As also described above, the cavity of the internal space at the front portion of the pulley hub is utilized without making the structure more complicated, and maintenance and inspection can be made easily.

What is claimed is:

1. In a crank damper pulley structure for an internal combustion engine having a crank shaft to the tip of which is fixed a pulley hub having a generally circular coaxial cavity in one end thereof, the improvement comprising:
    a damper support fixed to the interior peripheral surface of said cavity and having a flange extending radially inward at a substantially right angle to the hub axis; and
    a ring-like damper rubber fixed coaxially to one end of a ring-like damper mass, both comprising a dynamic damper, disposed coaxially in said cavity with said rubber fixed to said flange.

2. The improvement defined in claim 1 wherein said cavity is in that side of said hub opposite the engine.

3. The improvement defined in claim 2 wherein said damper support is fixed to a front part of said cavity and said damper mass is disposed between said support and the bottom of said cavity.

4. The improvement defined in claim 2 wherein the hub is keyed to the tip of the crank shaft and including circumferentially spaced projections on said support accessible by tool means for removing said hub from the tip.

5. The improvement defined in claim 4 wherein said projections are weld nuts.

6. The improvement defined in claim 1 wherein the surface of said damper support fixed to said hub is substantially coextensive with the entire circumferential surface of said cavity.

7. The improvement defined in claim 1 in which said damper mass comprises a plurality of axially spaced units joined by damper rubbers.

8. The improvement defined in claim 1 wherein said damper support is fixed by a screw thread to said pulley hub.

9. The improvement defined in claim 1 wherein said damper support is ring-like with an increased diameter portion at one end thereof and a reduced diameter portion at the other end thereof, and said damper mass surrounds said reduced diameter portion with a space therebetween.

10. The improvement defined in claim 1 wherein the average axial thickness of said damper mass varies circumferentially thereof to change the resonance frequency of the dynamic damper in accordance with the crank angle of the crank shaft.

11. The improvement defined in claim 1 wherein the unattached end surface of said damper mass opposite said rubber is substantially planar and perpendicular to the mass axis and the general axial thickness of said damper rubber varies circumferentially thereof.

12. The improvement defined in claim 1 including centrifugal cooling fins on that side of said damper support opposite the damper.

13. The improvement defined in claim 1 including a rubber ring disposed around the outer periphery of said damper mass to prevent direct contact of said mass with said surface of said pulley hub.

14. The improvement defined in claim 1 wherein said flange is substantially axially midway of said support and a dynamic damper is fixed to each side of said flange.

15. The improvement defined in claim 1 including a damper rubber and a damper mass comprising an annular torsional damper surrounding said hub with said rubber being interposed between and fixed to said mass and said hub.

16. The improvement defined in claim 15 including another dynamic damper fixed to one end of the mass of the torsional damper.

* * * * *